E. H. HUMPHREY.
FURNITURE CASTER.
APPLICATION FILED MAR. 19, 1909.
938,866.
Patented Nov. 2, 1909.
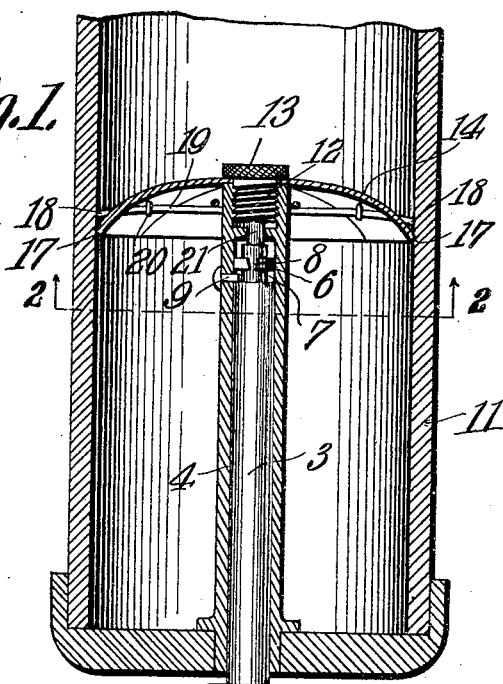
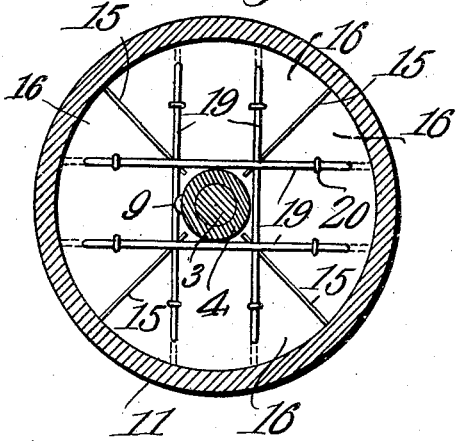
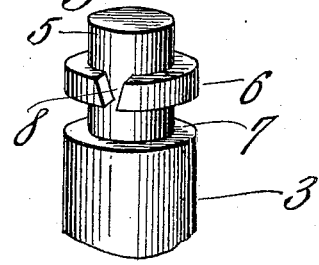
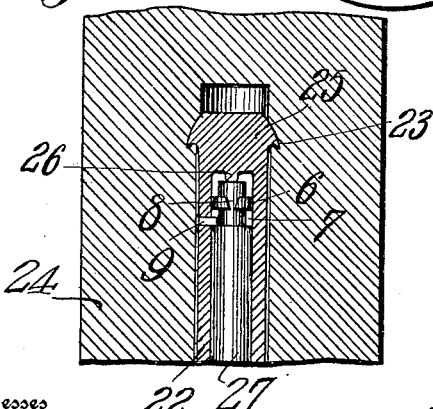
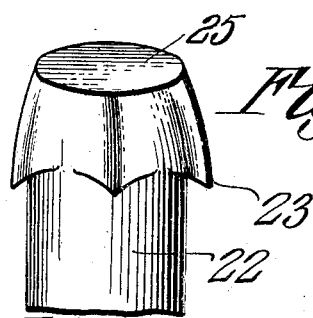
Inventor
Edwin H. Humphrey.
Witnesses
By C. A. Snow & Co.
Attorneys

UNITED STATES PATENT OFFICE.

EDWIN HALL HUMPHREY, OF CORRY, PENNSYLVANIA, ASSIGNOR, BY DIRECT AND MESNE ASSIGNMENTS, TO CORRY CASTOR CO., OF CORRY, PENNSYLVANIA.

FURNITURE-CASTER.

938,866.  Specification of Letters Patent.  Patented Nov. 2, 1909.

Application filed March 19, 1909. Serial No. 484,536.

*To all whom it may concern:*

Be it known that I, EDWIN H. HUMPHREY, a citizen of the United States, residing at Corry, in the county of Erie and State of Pennsylvania, have invented a new and useful Furniture-Caster, of which the following is a specification.

This invention relates to furniture casters.

The object of the invention is to provide a caster having a novel form of anchoring means, the construction of which shall be such that while presenting no interference to the seating of the caster, will be positive in preventing its accidental disconnection when the article of furniture with which it is equipped is handled or moved.

A further object is to adapt the improvements for use with any character of caster and to render it equally as effective in connection with metallic as with wooden furniture.

A still further object is positively to prevent any locking of the caster shank in its socket, whereby easy turning of the caster wheel about a vertical axis will at all times be assured.

With the above and other objects in view, as will appear as the nature of the invention is better understood, the same consists in the novel construction and combination of parts of a furniture caster, as will be hereinafter fully described and claimed.

In the accompanying drawings forming a part of this specification, and in which like characters of reference indicate corresponding parts, Figure 1 is a view in sectional elevation, of a caster constructed in accordance with the present invention. Fig. 2 is a horizontal sectional view taken on the line 2—2 of Fig. 1 and looking in the direction of the arrow thereon. Fig. 3 is a perspective detail view, on enlarged scale, of a portion of the caster shank shown in Fig. 1. Fig. 4 is a view in vertical longitudinal section through a slightly modified form of caster. Fig. 5 is a perspective detail view, on an enlarged scale, of a portion of the caster shown in Fig. 4.

Referring to the drawings, 1 designates the yoke of the caster, 2 the caster wheel, 3 the caster shank, and 4 the socket. As herein shown, the shank and socket are straight, but if preferred they may be made tapered, in the usual manner, without departing from the spirit of the invention. The inner end of the shank, is circumferentially reduced, as shown at 5, and upon this reduced portion is arranged a collar 6 that defines a channel 7. The collar is provided with a wedge-shaped notch 8 that is designed to permit passage to the channel of a pin 9 carried by the upper portion of the socket, the pin being slightly greater in diameter than the narrow end of the notch, so that when the shank is driven to its seat, and the pin is forced between the walls of the slot, there will be no danger of the shank becoming accidentally disconnected from the socket. The lower end of the socket has cast or otherwise secured to it a cupped head or plate of a size to receive the lower end of the leg 11 of the article of furniture, when the same is of metal, thus to hold the shank rigid and properly centered. The upper end of the socket is internally threaded to receive a short bolt 12 provided with a head 13 that operates to clamp or secure to the socket the anchoring member 14, which is a concavo-convex disk, of resilient metal, and is provided with a plurality of radial slots 15, in this instance four, which define a like number of segmental sections 16 the outer edges of which are beveled, as at 17, in order to cause them to dig into the metal of the leg and thus prevent accidental disconnection of the caster therefrom, this result being due to the fact that the convex surface of the disk is uppermost, as shown in Fig. 1. This anchoring feature is augmented by the employment of a plurality of spurs 18 formed by the terminals of crossed resilient wires 19 that project through orifices in the disk and are held against accidental separation therefrom by stops 20 rigid with the wires. As a means for reducing the friction of the turning of the shank relatively to the socket, the bolt 12 is provided with a small teat 21 that bears upon the inner terminal of the shank and receives all of the weight of the article of furniture with which it is assembled.

The form of caster shown in Figs. 4 and 5 is designed more particularly for use in connection with wood furniture, and comprises a socket 22, the head of which is provided with anchoring members 23, that operate in the same manner as the segments 16 of the form shown in Figs. 1 and 2, and are adapted to dig into the wood of the leg 24. The head 25 of the socket is provided with a teat 26 designed to engage with the inner terminal of the shank 27, in the same manner as that shown in Fig. 1.

From the foregoing description it will be seen that although the improvements herein defined are simple in character, that they will coact in the production of an efficient, durable, and highly useful form of furniture caster.

What is claimed is:

1. A caster comprising a socket provided with a concavo-convex apertured leg-engaging disk, supplemental resilient leg-engaging devices extending through the apertures, a shank engaging the socket, and means for holding the shank and socket detachably assembled.

2. A caster comprising a shank, a socket, and an adjustable teat in the socket and interposed between the inner end of the shank and one end of the socket to receive the thrust of the former.

3. A caster comprising a shank having its inner end reduced and provided with a collar defining a circumferential channel and formed with a wedge-shaped notch, and a socket provided with a pin to engage the channel and being of slightly greater diameter than the narrow end of the notch, whereby the accidental separation of the parts is prevented.

4. A caster comprising a shank furnished adjacent to one end with a circumferential channel, a socket provided with a pin to engage the channel, and an adjustable reduced teat in the socket and interposed between the inner end of the shank and one end of the socket to receive the thrust of the former.

5. A caster comprising a socket, a radially slotted concavo-convex disk carried thereby, the edge of said disk constituting leg-engaging means, said disk having apertures therein, crossed supplemental leg-engaging devices extending under the disk and through and beyond the apertures, and a shank engaging and disposed to rotate within the socket.

In testimony that I claim the foregoing as my own, I have hereto affixed my signature in the presence of two witnesses.

EDWIN HALL HUMPHREY.

Witnesses:
 ROLAND C. BOOTH,
 E. DANIELS.